(12) United States Patent
Szummer et al.

(10) Patent No.: US 7,720,773 B2
(45) Date of Patent: May 18, 2010

(54) PARTITIONING DATA ELEMENTS OF A VISUAL DISPLAY OF A TREE USING WEIGHTS OBTAINED DURING THE TRAINING STATE AND A MAXIMUM A POSTERIORI SOLUTION FOR OPTIMUM LABELING AND PROBABILITY

(75) Inventors: Martin Szummer, Cambridge (GB); Philip Cowans, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/275,404

(22) Filed: Dec. 29, 2005

(65) Prior Publication Data

US 2007/0156617 A1 Jul. 5, 2007

(51) Int. Cl.
*G06E 1/00* (2006.01)
*G06E 3/00* (2006.01)
*G06F 15/18* (2006.01)
*G06G 7/00* (2006.01)

(52) U.S. Cl. ...................................................... 706/20
(58) Field of Classification Search .................... 703/2; 382/419, 155; 706/20
See application file for complete search history.

(56) References Cited

U.S. PATENT DOCUMENTS

| | | | |
|---|---|---|---|
| 4,975,960 A * | 12/1990 | Petajan | 704/251 |
| 5,894,525 A | 4/1999 | Nohl et al. | |
| 6,175,844 B1 | 1/2001 | Stolin | |
| 6,556,960 B1 * | 4/2003 | Bishop et al. | 703/2 |
| 6,563,950 B1 | 5/2003 | Wiskott | |
| 6,594,393 B1 | 7/2003 | Minka et al. | |
| 6,671,661 B1 * | 12/2003 | Bishop | 703/2 |
| 6,754,386 B1 | 6/2004 | Williamson et al. | |
| 6,763,137 B1 | 7/2004 | Krtolica | |
| 6,876,765 B2 | 4/2005 | Suzuki | |
| 2003/0033347 A1 * | 2/2003 | Bolle et al. | 709/107 |
| 2005/0100214 A1 | 5/2005 | Zhang et al. | |
| 2005/0102285 A1 | 5/2005 | Austin | |
| 2006/0045337 A1 | 3/2006 | Shilman et al. | |
| 2006/0078202 A1 | 4/2006 | Shilman et al. | |
| 2006/0115145 A1 * | 6/2006 | Bishop et al. | 382/155 |
| 2007/0185946 A1 * | 8/2007 | Basri et al. | 708/200 |

OTHER PUBLICATIONS

P. Carbonetto, N. de Freitas, and K. Barnard, "A Statistical Model for General Contextual Object Recognition," Lecture Notes in Computer Science, pp. 350-362, 2004.*

(Continued)

*Primary Examiner*—David R Vincent
*Assistant Examiner*—Ben M Rifkin
(74) *Attorney, Agent, or Firm*—Lee & Hayes, PLLC

(57) ABSTRACT

We set out a graphical model for describing probability distributions over labeled partitions of an undirected graph which are conditioned on observed data. We show how to efficiently perform exact inference in these models, by exploiting the structure of the graph and adapting the sum-product and max-product algorithms. The method can be used for partitioning and labeling hand-drawn ink fragments, image data, speech data and natural language data amongst other types of data elements. A significant performance increase is obtained by labeling and partitioning simultaneously. It is also possible to partition without labeling.

9 Claims, 13 Drawing Sheets

OTHER PUBLICATIONS

P. Cowans, "The Sum-Product and Max-Product Algorithms for Graph Partitions," Draft Technical Note, pp. 1-7. 2004 http://research.microsoft.com/~szummer/aaai04/tech_report.pdf.*

P. Carbonetto, N. de Freitas, and K. Bernard, "A statistical Model for General Contextual Object Recognition," Lecture Notes in Computer Science, pp. 350-362, 2004.*

Felzenszwalb, Pedro and Huttenlocher Daniel. Efficient Graph-Based Image Segmentation. Inetrnational Journal of Computer Vision 59(2), 167-181, 2004.*

E. Bengoetxea et al., "Image Recognition with Graph Matching Using Estimation of Distribution Algorithms", In Proceedings of Medical Image Understanding and Analysis, 2001, pp. 89-92.

J.M.Buhmann et al., "Image recognition: Visual grouping, recognition, and learning", PNAS, Dec. 7, 1999, pp. 14203-14204, vol. 25, No. 25.

N. Vasconcelos, "On the efficient evaluation of probabilistic similarity functions for image retrieval", IEEE Transactions on Information Theory, Jul. 2004, pp. 1482-1296, vol. 50, No. 7.

M. Shilman et al., "Recognition and Grouping of Handwritten Text in Diagrams and Equations", Microsoft Research, 2004.

* cited by examiner

PARTITIONING DATA ELEMENTS OF A VISUAL DISPLAY OF A TREE USING WEIGHTS OBTAINED DURING THE TRAINING STATE AND A MAXIMUM A POSTERIORI SOLUTION FOR OPTIMUM LABELING AND PROBABILITY

TECHNICAL FIELD

This description relates generally to partitioning data elements and more specifically to partitioning two dimensional or higher dimensional data elements.

BACKGROUND

Partitioning data elements into parts is a particular problem in many fields such as computer vision, handwriting recognition (including electronic ink handwriting), speech recognition and natural language processing. We use the term "partitioning" herein to refer to finding one or more sets of data elements (be they image elements, speech elements, handwriting elements, video image elements or other data elements) where the data elements in a set belong to the same particular part. For example, in the field of computer vision the part can be an object and in the field of natural language the part might be a word, phrase or phoneme. In contrast, the term "labeling or classifying" is used herein to refer to identifying whether data elements are of a particular type rather than that they are a particular item. For example, whether electronic ink strokes constitute a box or a connector between boxes in an organization chart.

Partitioning data elements is a complex task especially because data elements are typically individually ambiguous. Thus it is difficult to provide systems for automatically partitioning data elements which provide accurate and reliable results in computationally inexpensive ways. This is particularly so for two dimensional and higher dimensional data elements such as image data elements from digital still images, video images, electronic ink images and the like.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

We set out a graphical model for describing probability distributions over labeled partitions of an undirected graph which are conditioned on observed data. We show how to efficiently perform exact inference in these models, by exploiting the structure of the graph and adapting the sum-product and max-product algorithms. We demonstrate our approach on the task of segmenting and labeling hand-drawn ink fragments, and note that there is a significant performance increase is obtained by labeling and partitioning simultaneously.

The present example provides a method of automatically partitioning data elements into one or more parts. For example, the data elements can be electronic ink fragments, speech fragments, natural language elements, video image elements, medical image elements, digital still image elements or other suitable data elements. The method comprises:

accessing information about the data elements;
forming an undirected graphical model of the data elements using the accessed information; and
using the undirected graphical model to partition the data elements into the parts.

For example, the accessed information about the data elements comprises computed features of those elements as described in more detail below.

In another example, a system for automatically partitioning data elements using this method is provided. In one case, the data elements are also classified or labeled by the system at the same time as performing the partitioning.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In our earlier work (Martin Szummer and Yuan Qi, "Contextual Recognition of Hand-drawn Diagrams with Conditional Random Fields", 26 Oct., 2004, $9^{th}$ International Workshop on Frontiers in Handwriting Recognition (IWFHR) F. Kimura and H. Fujisawa 32-37) we describe using Conditional Random Field techniques for labeling or classifying electronic ink (digitized handwriting or drawing) elements as being of a particular type. This work is also described in our U.S. Utility Patent Application filed on Oct. 21, 2005 entitled Digital Ink Labeling and based on U.S. Provisional Patent Application No. 60/621,250, filed Oct. 21, 2004. Undirected graphical models of other types such as Markov Random Field techniques have also been used previously for labeling or classifying image elements. The present invention extends and further develops our earlier work to address the problem of automated data partitioning either with or without classification/labeling.

Figure 1:
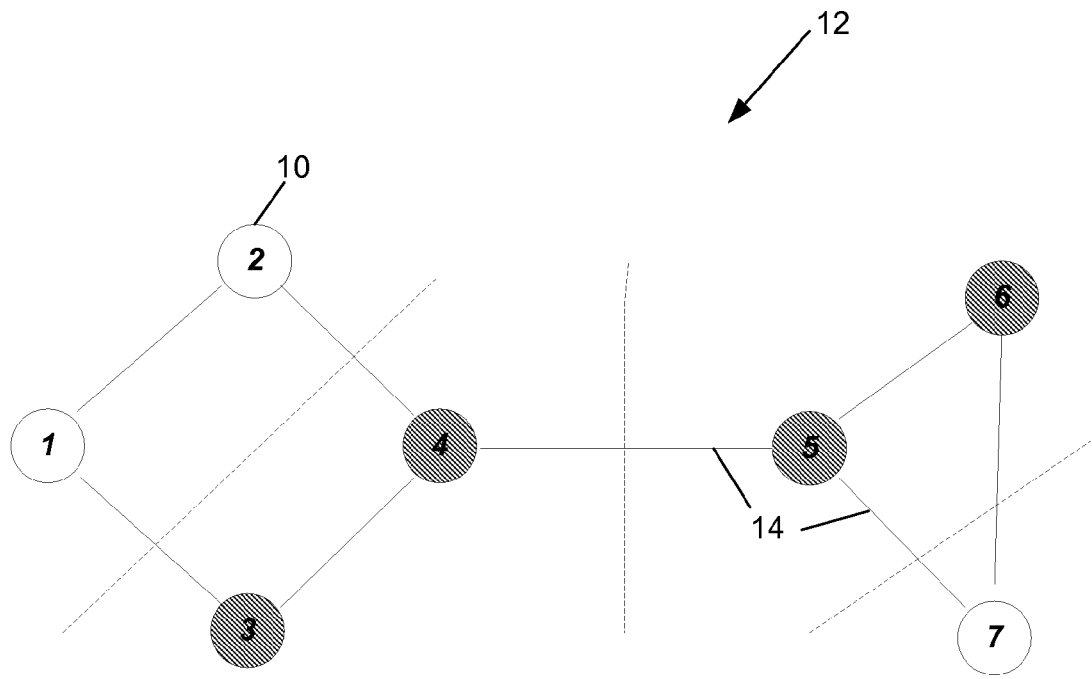
FIG. 1 shows labeled and partitioned data elements.

FIG. 1 is a high level diagram indicating labeled and partitioned data elements. The data elements are represented by nodes 10 in a graph 12 and links 14 between nodes are used to represent relationships between the data elements. Two label types are used indicated by shading or no shading in the Figure. Four partitions are indicated separated by dotted lines. The nodes 10 (also referred to as vertices) are numbered 1 through 7 for clarity and the partitions are as follows: (1, 2, +), (3, 4, −), (5, 6, −), (7, +), where the last symbol in each group indicates the label assigned to that part. The term "part" is used herein to refer to one of the entities resulting from a partition; more formally, a subset in the partition. A part may or may not have semantic meaning.

As mentioned above, we have previously developed a method of labeling using CRFs. For example, this would enable nodes in the graph 12 of FIG. 1 to be labeled as shaded or not shaded; the method did not provide partitioning into parts as indicated by the dotted lines.

For reasons of clarity examples will now be described where the data elements are electronic ink fragments of a hand drawn organization chart diagram comprising boxes linked by connectors. The class or label types are then "box" and "connector" and the parts are for example, "box at the top right", "connector joining box at the top right to its nearest neighbor". However, it is noted that the invention is not limited to electronic ink fragments or indeed electronic ink fragments of organization chart drawings. Any suitable data elements and class or label types can be used.

Figure 2:
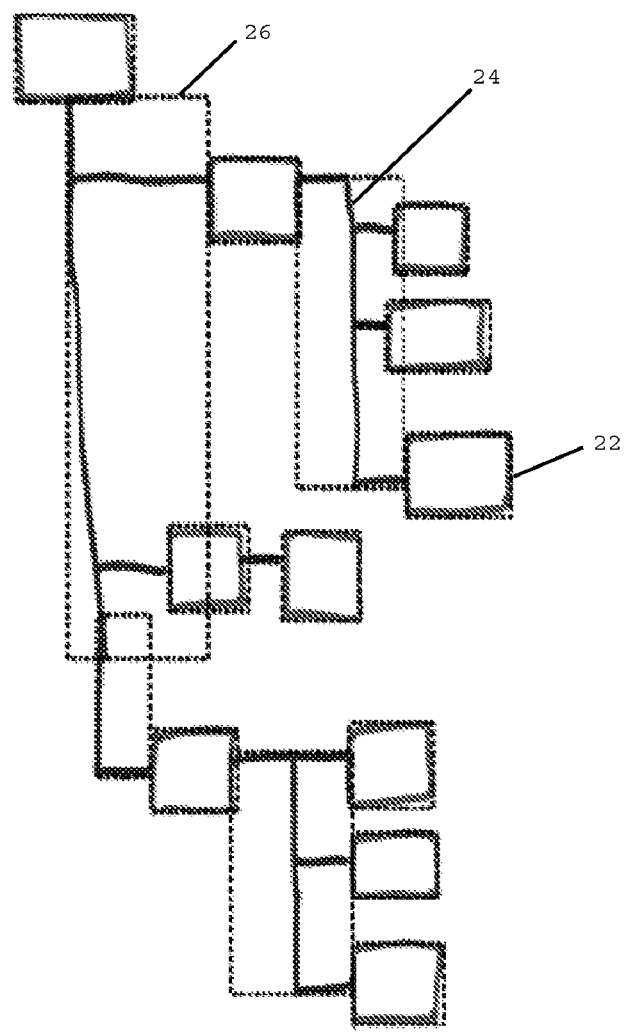
FIG. 2 shows labeling and partitioning results for a hand-drawn organization chart.

The difference between labeling and partitioning is demonstrated in FIG. 2 which shows a hand-drawn organization chart 20. Objects are labeled as either containers 22 or connectors 24 with heavy lines indicating fragments which have been classified as containers and lighter lines indicating connectors. Groups of fragments which belong to the same part are outlines using a dashed box 26. This example shows results obtained from a working example of our system performing combined labeling and partitioning. It is also possible for the system to perform partitioning alone without labeling.

A summary of the method of classifying or labeling described in our earlier work is now given to aid understanding of the present invention.

Figure 3:
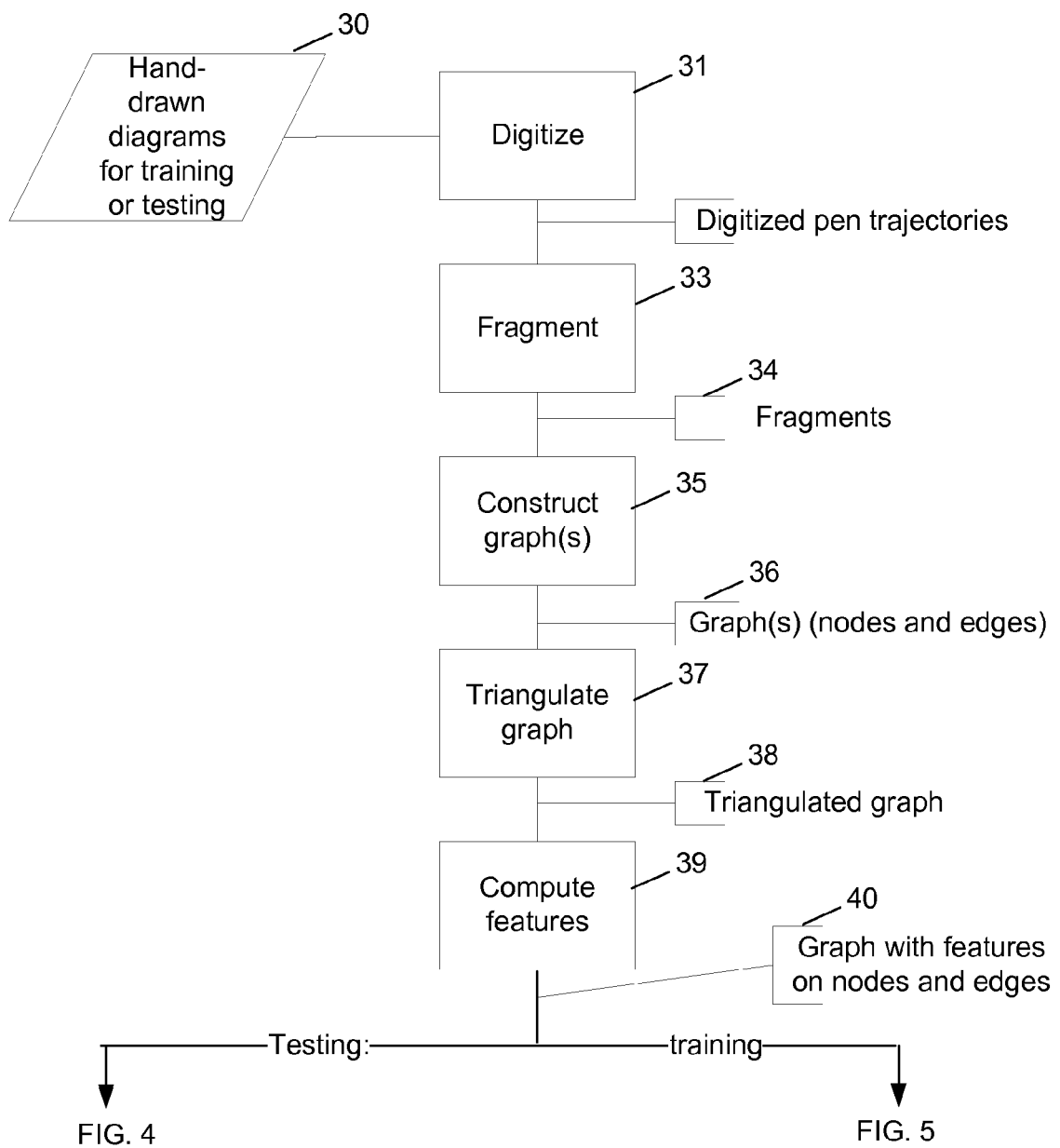
FIG. 3 is a flow diagram of an initial part of a method for automatically labeling data elements using conditional random field techniques.
Figure 4:
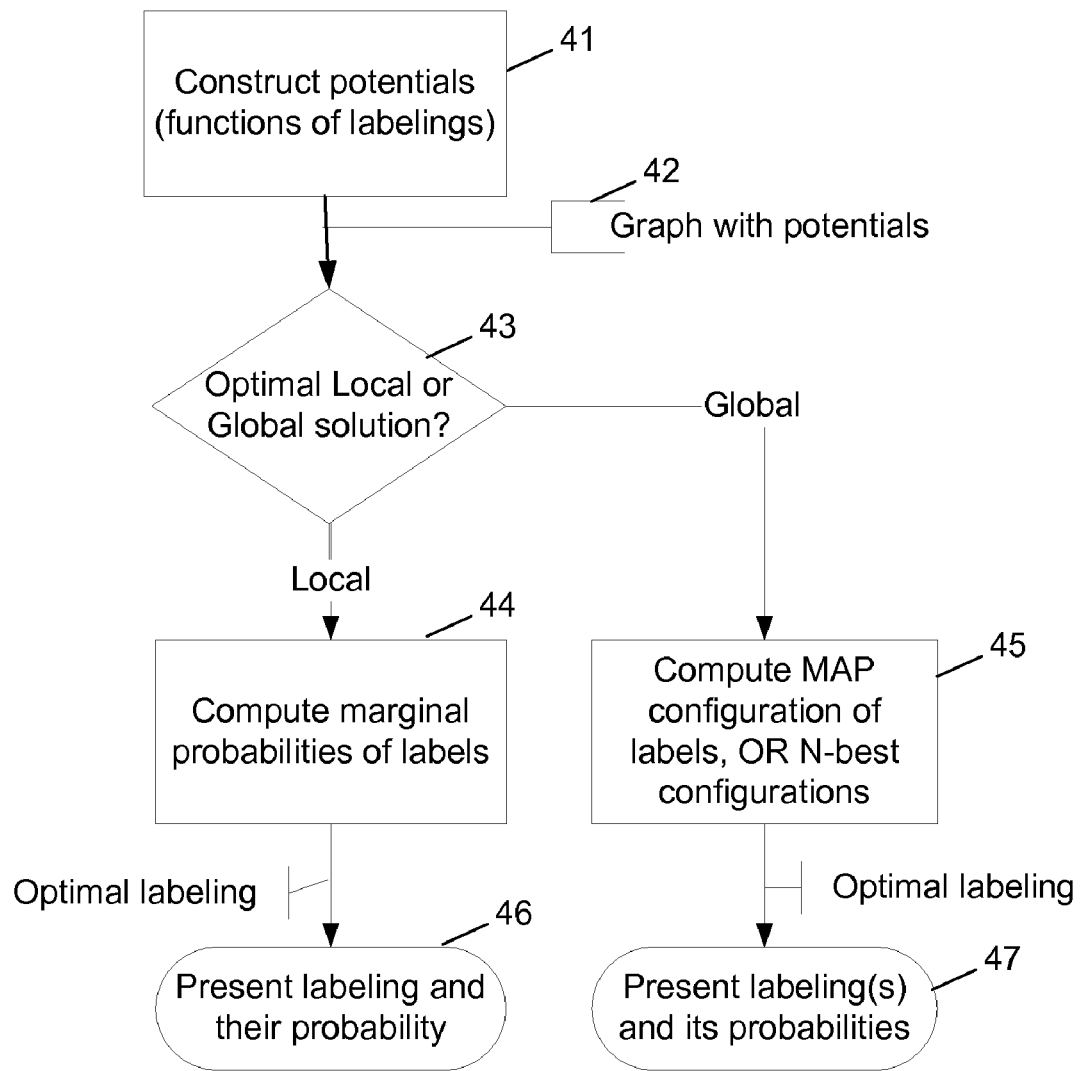
FIG. 4 is a flow diagram of a testing part of the method of automatically labeling data elements of FIG. 3.
Figure 5:
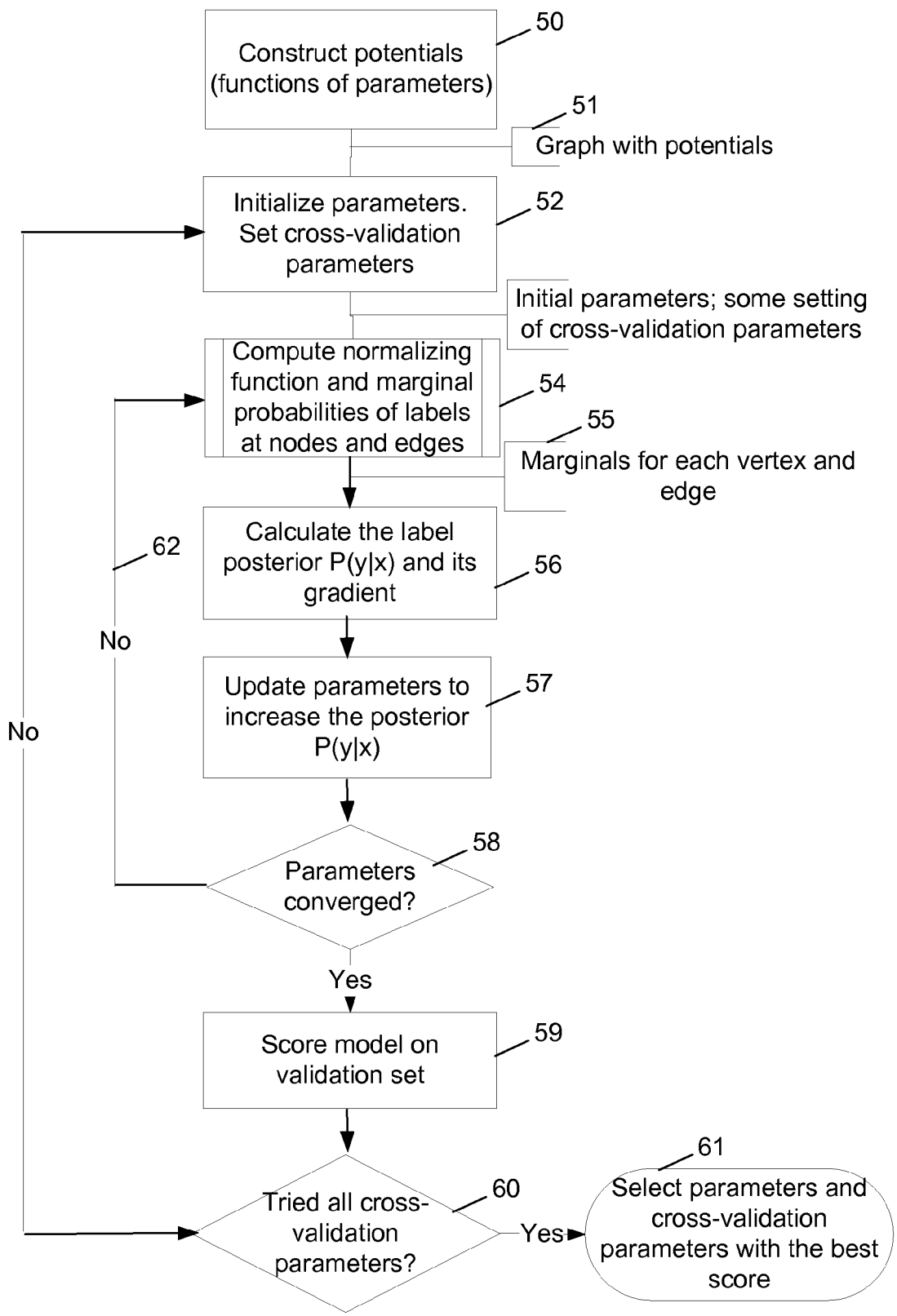
FIG. 5 is a flow diagram of a training part of the method of FIG. 3.

FIGS. 3, 4 and 5 are high level flow diagrams of a method of classifying or labeling as described in our earlier work. Hand-drawn diagrams 30 for training or testing are accessed, for example, being electronic ink organization chart drawings. These are digitized 31 using any suitable digitization means as known in the art and the resulting digitized pen trajectories 32 are passed to a process which forms those trajectories or strokes into fragments 34. For example, a single ink stroke may comprise the four edges of an organization chart box and a connector projecting from the box. The ink stroke is divided into sections which are straight to within a given tolerance and these sections are referred to as ink fragments. For example, each side of the box would be a different ink fragment.

Figure 11:
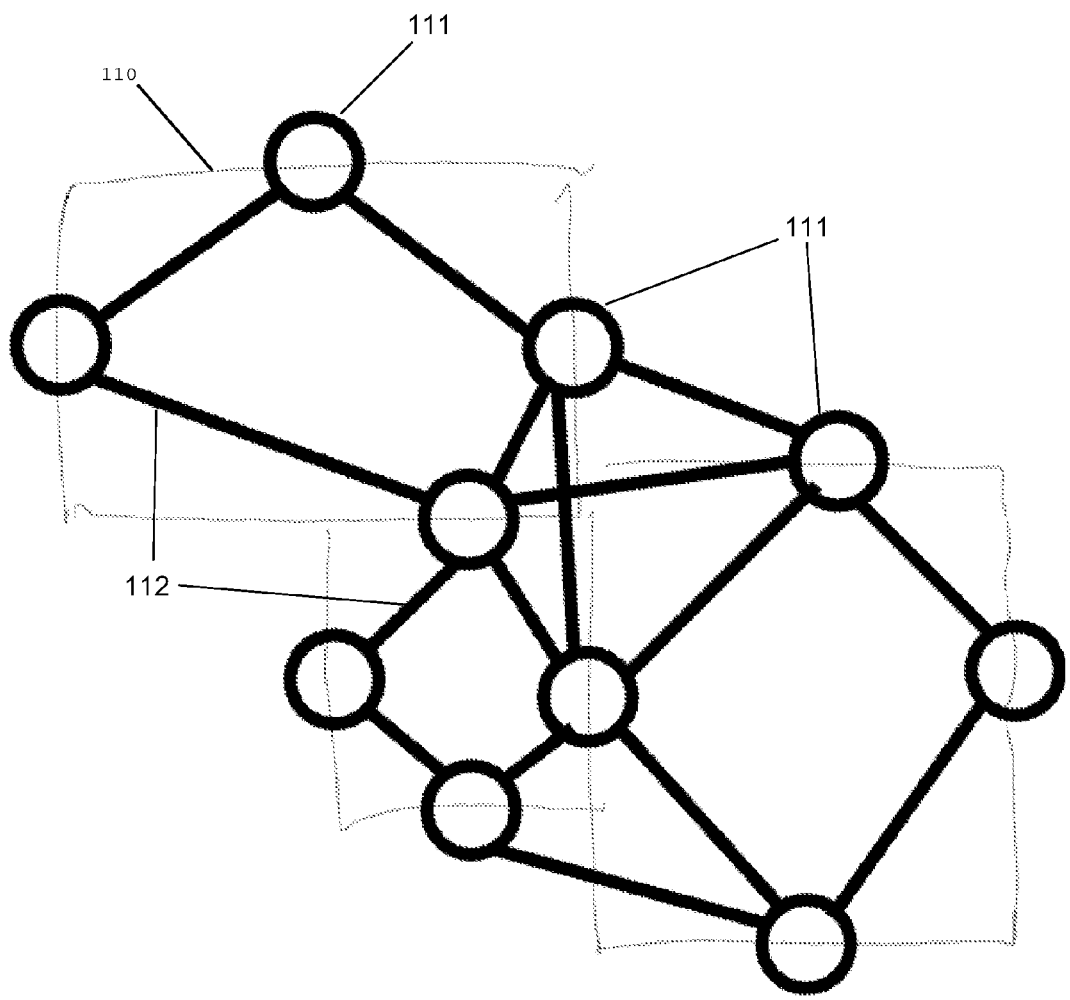
FIG. 11 is an example of an undirected graph constructed from ink fragments.

Having fragmented the strokes an undirected graph is constructed 35 comprising one vertex (or node) for each ink fragment. This is illustrated in FIG. 11 where dotted lines 110 represent ink fragments and one vertex 111 is present for each ink fragment. All nodes corresponding to pairs of fragments satisfying an appropriate (pre-specified) constraint are linked to form a graph as shown in FIG. 11. The constraint can be a distance constraint, a measure of dependence, a measure of probabilistic dependence or any other suitable constraint. The links 112 are also referred to as edges. The graph nodes and edges 36 are then passed to a process 37 for triangulating the graph. In order to triangulate the graph edges are added so that every cycle of length greater than three is spanned by a chord. The graph in FIG. 11 is not triangulated.

Features are next computed 39 resulting in a graph with features associated with its nodes and edges 40. Feature values are obtained from observed data, that is, characteristics of the fragments such as lengths and angles. Feature values associated with a node are obtained from the fragment associated with that node. Feature values associated with an edge in the graph are dependent on pairs of fragments. These may include the distance and angle between the pair of fragments for example. The graph with its associated feature information is then used in a training stage (see FIG. 5) in order to find appropriate weighting values and marginal probability values. The training stage makes use of known data from hand-drawn organization charts which have been manually labeled. Using the values determined during training it is then possible to label unknown hand-drawn organization chart drawings as set out in FIG. 4.

A test phase is now described with reference to FIG. 4. Potential functions are constructed 41. For each node in the graph a site or node potential is formed which measures the compatibility of one label with its associated fragment as a function of model parameters (also referred to as weights). For each edge an interaction potential is formed which indicates the compatibility between two neighboring labels depending on their associated fragments and parameters. Once the potentials are formed this results in a graph with node and edge potentials 42.

If training has already taken place, weights and any other required parameters are known. Using CRF a joint label probability is defined. The weights obtained during training are used and a maximum a posteriori (MAP) (box 45 of FIG. 4) or maximum marginal (MM) (box 44 of FIG. 4) solution is sought in order to find an optimum labeling and its probability (boxes 46 and 47 of FIG. 4).

FIG. 5 shows the training stage. Potentials for nodes and edges are formed 50 for the training data resulting in a graph with potentials 51. Parameters in the potential functions are then initialized 52 for example to any suitable random value. For example, these are small real numbers close to zero. Some cross-validation parameters are also set 53. Gradient ascent is used to find a global maximum of the joint label probability. This is indicated by the loop 62 in FIG. 5. This loop involves calculating a normalizing function and marginal probabilities 54, 55 of labels at nodes and edges. Thus computational cost is dominated by this part of the calculation. We use message passing techniques to make this calculation feasible as described in more detail below with reference to FIG. 9.

Once the normalizing function and the marginal probabilities have been calculated the label posterior P is calculated and its gradient (see box 56). The parameters are updated to increase the posterior (see box 57) and a check is made to see if the parameters have converged (box 58). If not, the loop 62 is repeated. Once the parameters have converged the model is scored against a set of validated data (see box 59) the validated data being fragments with known labels. If all cross-validation parameters have been tried (box 60) the parameters and cross-validation parameter with the best score are selected for use in the test phase.

Figure 9:
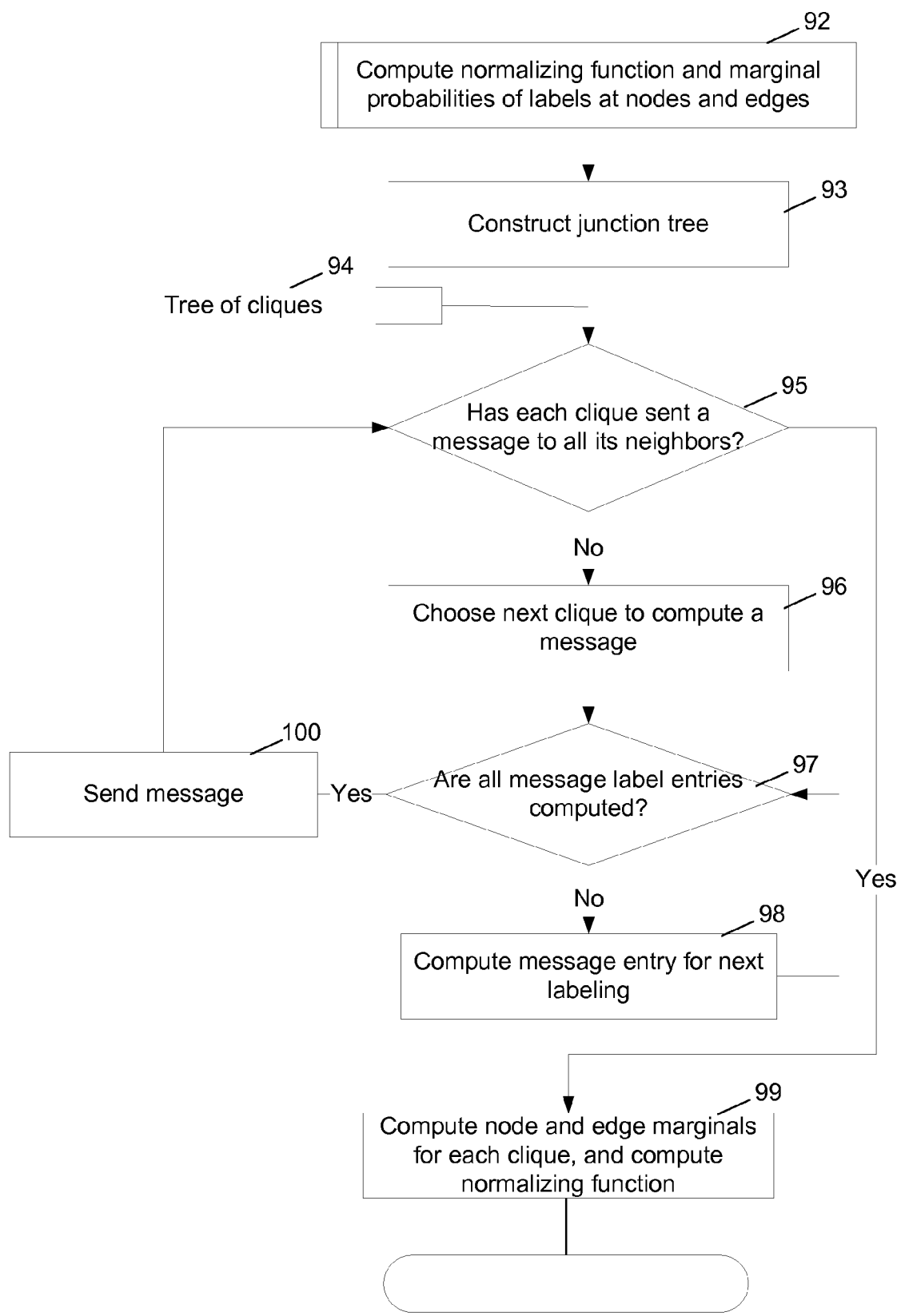
FIG. 9 is a flow diagram of a message passing part of the method of FIG. 5.

The message passing techniques used to make the computation of the normalizing function and marginal probabilities feasible are now described with reference to FIG. 9. In order to compute the normalizing function and marginal probabilities of labels at the nodes and edges (see box 92) cliques are first found in the triangulated graph and a junction tree constructed from the cliques (see box 93). A clique is a set of nodes which form a subgraph that is complete (fully connected by edges) and maximal (no nodes can be added without losing completeness; in other words, a clique cannot be a subset of another clique). For example, for an acyclic graph such as a tree the cliques consist of the pairs of nodes connected by edges and any individual isolated nodes not connected to anything. In general terms, calculation of the marginal probabilities is performed only over the cliques and also using message passing techniques so that computation is reduced as compared with calculating the marginal probabilities for all nodes in the graph. Starting from the leaves of the clique tree 94 the marginal probabilities are calculated and information about elements shared between a current clique and its neighbors is passed to those neighbors. Message passing travels in this way to the root of the tree and back again (or vice versa as appropriate). In FIG. 9 this process is illustrated in an example by first checking that each clique has sent a message to all its neighbors (see box 95). If not, then the next clique to compute a message is chosen (box 96) and a check is made as to whether all message label entries have been computed for that clique (see box 97). If no this is computed (see box 98) and if yes, a message is sent (box 100) onwards in the clique tree. Once the message passing process has completed the node and edge marginals for each clique and the normalization function are calculated (see box 99).

FIGS. 3, 4, 5 and 9 describe a method of labeling ink fragments which can be performed as described in our earlier work. In the present invention we consider the problem of partitioning data elements (which can be ink fragments or other data elements) and also of jointly partitioning and labeling. We define a part as being represented by a contiguous region in an undirected graphical model, all nodes in that contiguous region having the same label. It is difficult to partition such an undirected graphical model into parts using the labeling scheme of our previous work. In order to do that, a part ID would be assigned to each vertex. Contiguous regions with the same part ID are then assigned to the same part. To allow for labeled partitions, a separate set of part IDs would need to be reserved for each label. Using such a method it is difficult to find the number of parts needed. To be sure that enough parts are provided it is necessary to provide the same number of parts as there are nodes. This increases computational expense. In addition, symmetry problems arise which lead to bias in the probability estimates of partitions. In order to address these problems we extend the CRF framework to work directly with labeled partitions. As a result it is not necessary to worry about the number of parts needed, symmetry problems are avoided and complexity is reduced. In addition, for combined labeling and partitioning, the total number of possible labeled partitions is much, much larger than for the total number of labelings alone. However, we provide a method which enables joint labeling and partitioning to be achieved simply and effectively.

Figure 6:
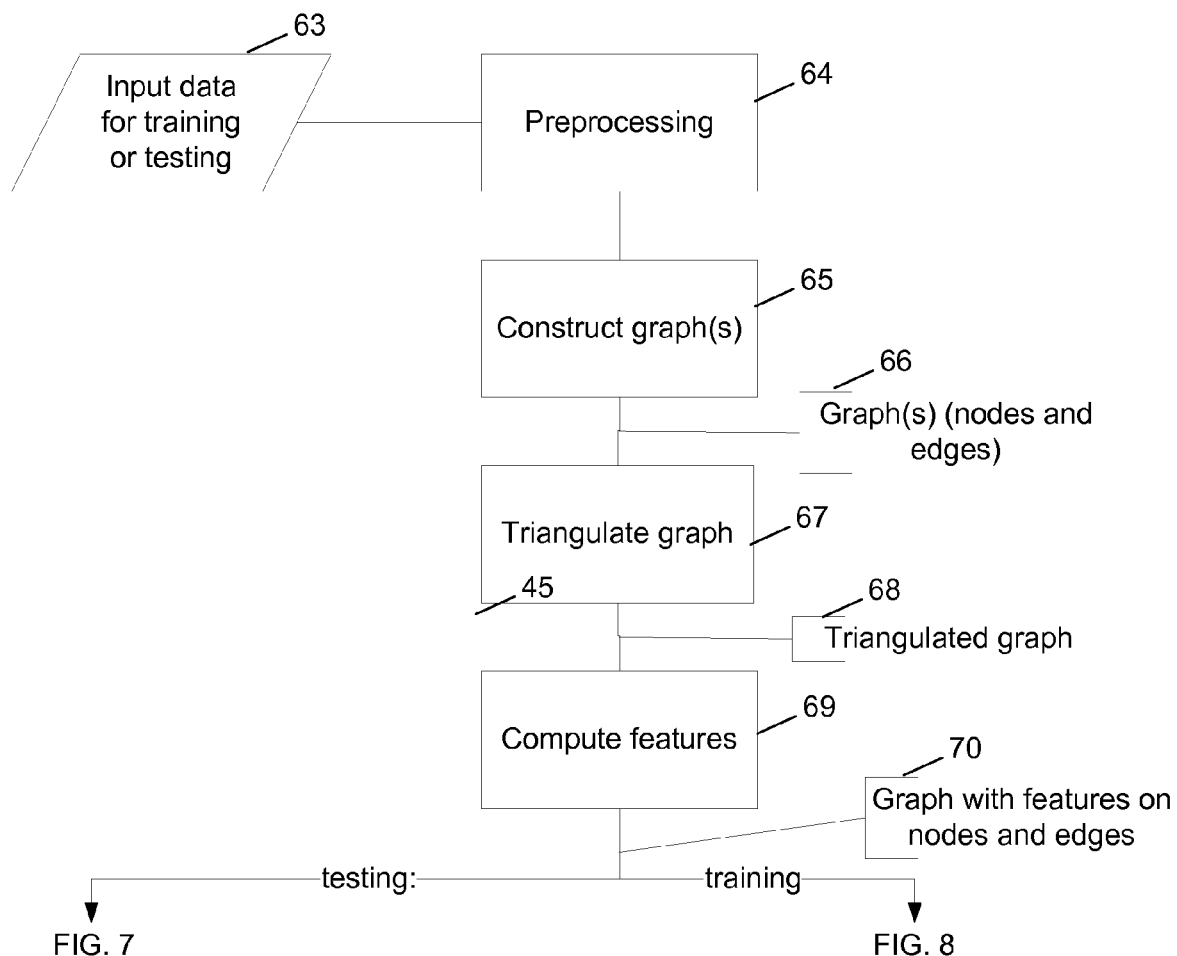
FIG. 6 is a flow diagram of an initial part of a method for automatically labeling and partitioning data elements using conditional random field techniques.

FIG. 6 shows the initial part of the method. It is similar to FIG. 3 except that the input data 63 can be of any suitable type such as electronic ink drawings, video images, medical images, digital still images, speech and natural language. The input data 63 is preprocessed in any suitable manner in order to identify data fragments, be they ink fragments, speech fragments, video image fragments or other. Undirected graphs are constructed 65 with nodes and edges 66. The graph is triangulated 67, 68 and features computed from the data fragments are associated with the graph nodes and edges 70.

Figure 7:
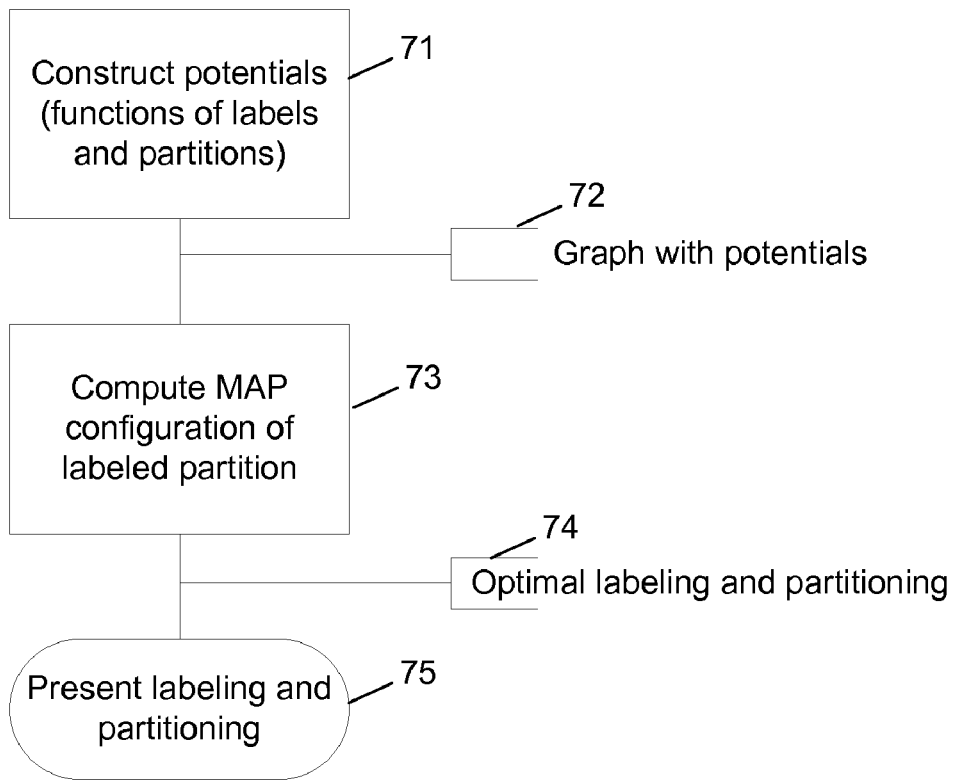
FIG. 7 is a flow diagram of a testing part of the method of FIG. 6.

During testing new data fragments are used to form the graph. Potential functions 71 (see FIG. 7) are formed, this time being a function of labels and partitions (or just partitions) rather than just labels as in our earlier work. First the potential functions are constructed for each node and edge in the graph. The potential functions for the edge potentials are different than in the case of labeling alone. The edge potential varies according to whether the nodes at each end of the edge belong to the same part, different parts with the same label or different parts with different labels. Weights for the potential functions are pre-computed during a training stage described below. A graph with potentials 72 results and a maximum a posteriori (MAP) configuration of the labeled partition (or non-labeled partition) 73 is calculated. The optimal labeling and partitioning 74 (or just the optimal partitioning) is then presented 75.

Figure 8:
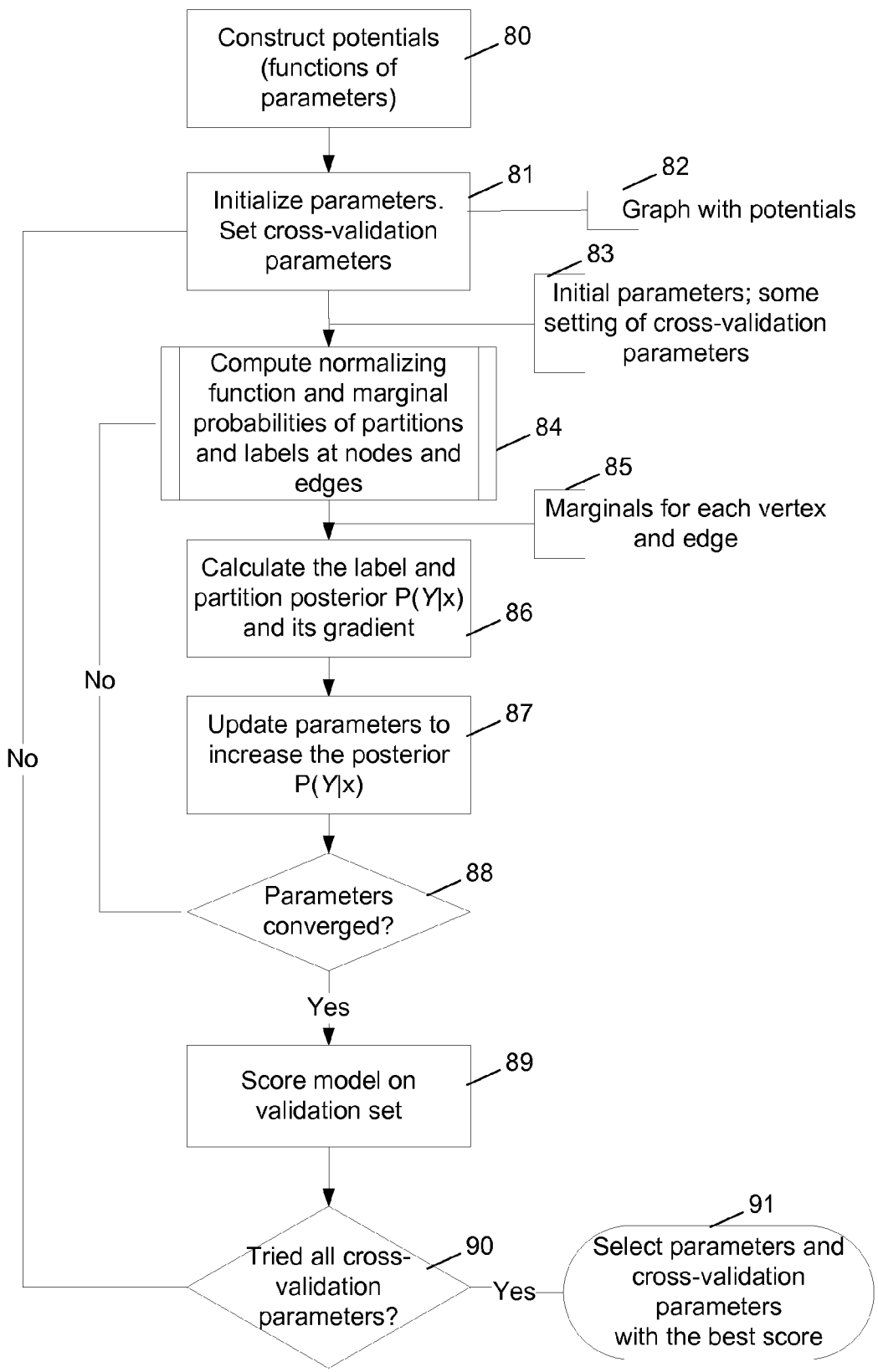
FIG. 8 is a flow diagram of a training part of the method of FIG. 6.

During training (see FIG. 8) known data fragments are used to form the graph. FIG. 8 is the same as FIG. 5 except for a number of points. Once a graph with potentials 82 has been formed the parameters are initialized and cross-validation parameters set (box 81 and 83). A normalizing function is computed together with marginal probabilities of partitions (or partitions and labels) at the nodes and edges (see box 84). This differs from the case of labeling alone because the marginal probabilities range over different spaces. Once marginals for each node and edge are obtained 85 the partition posterior and its gradient is calculated (box 86) or the label and partition posterior in the case of joint labeling and partitioning. The parameters are updated to increase the posterior (box 87) and the process repeated until the parameters converge (box 88). In that case the model is scored against a validation set (box 89) and if all the cross-validation parameters have been tried then the parameters and cross-validation parameters with the best score are selected (box 91) for use in the test phase.

Figure 10:
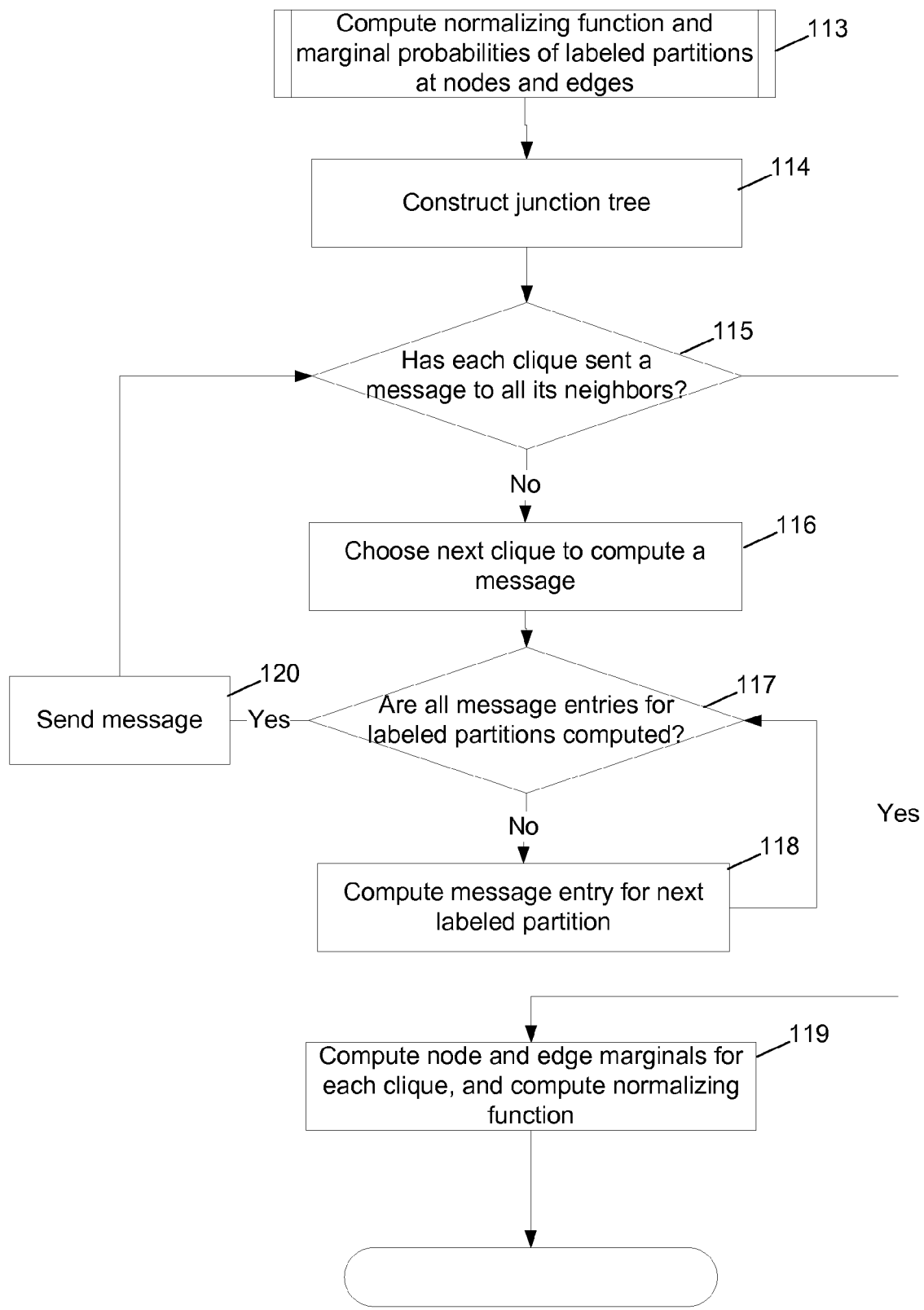
FIG. 10 is a flow diagram of a message passing part of the method of FIG. 8.

FIG. 10 illustrates how we used message passing to compute the normalizing function and marginal probabilities of the labeled partitions (or non-labeled partitions) at nodes and edges (box 113). Cliques are identified in the triangulated graph and a junction tree formed from those cliques (box 114). Message passing is carried out as in FIG. 9. but in this case we use a modified version of the known sum-product algorithm with the message passing in order to enumerate all possible labeled partitions and either sum or maximize over them. We carry out message passing over partitions or labeled partitions in contrast to the message passing carried out in the earlier work on labeling alone. Boxes 115 to 120 of FIG. 10 indicate similar methods to that of FIG. 9 boxes 95 to 100 although in the case of FIG. 10 the modified sum-product algorithm is used and message passing is over partitions or labeled partitions.

Figure 13:
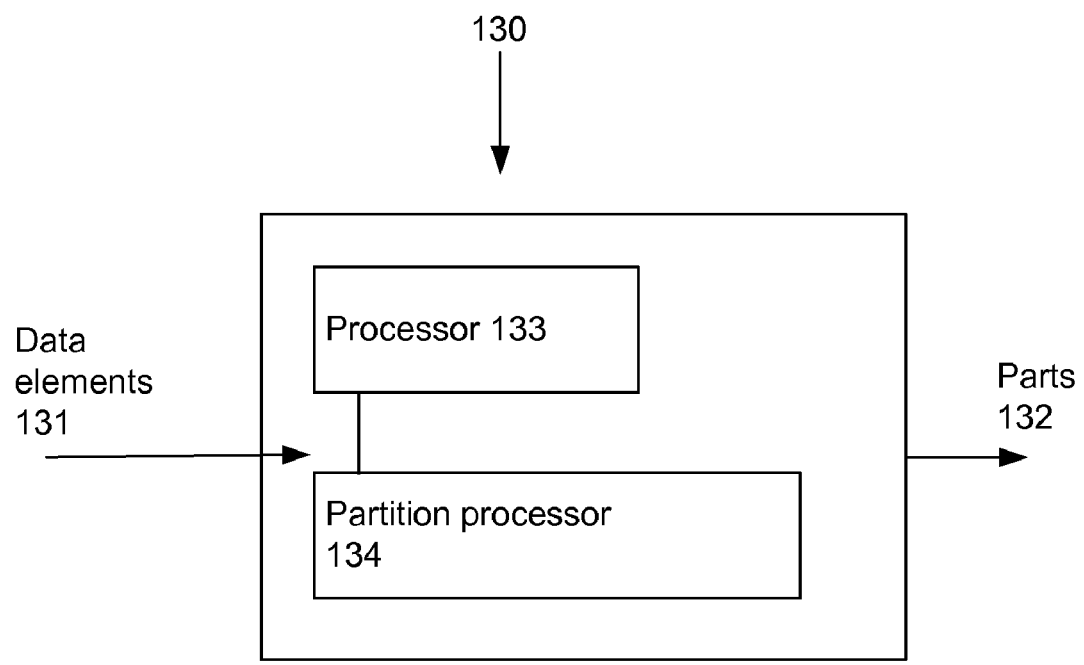
FIG. 13 is a schematic diagram of a system for automatically partitioning data elements.

FIG. 13 is a schematic diagram of a system 130 for partitioning data elements 131 automatically into one or more parts 132. An input A accesses information about the data elements 131. A processor 133 forms an undirected graphical model of the data elements using the accessed information. A partition processor 134, which may or may not be integral with the processor 133 uses the undirected graphical model to partition the data elements into the parts.

A particular example of joint labeling and partitioning using the present invention is now described in detail.

Probabilistic models are usually defined over the Cartesian product of a number of discrete or continuous one-dimensional spaces. For example, models performing joint binary classification of N objects are defined over $\{-1, +1\}^N$. While in many cases it is intractable to explicitly enumerate all possible configurations, in the case of graphical models where the probability distribution factors according to the structure of an undirected graph, message passing techniques such as the sum-product and max-product algorithms can be used to render the computation feasible.

In this work, we extend the graphical model formalism to the case of probability distributions defined over labeled partitions of an undirected graph; in other words, possible divisions of the graph into sets of vertices referred to as parts, where each part is assigned a label. An example of a labeled partition is given in FIG. 1. Note that the number of parts varies between partitions and is usually unknown in advance. Our method represents partitions directly, rather than incorporating part identifiers into the labels. We thereby avoid the degeneracy that different permutations of part identifiers represent the same partition. In this work we restrict ourselves to binary labels, but the method can be generalized straightforwardly to larger label sets. Conversely, unlabeled partitioning may be viewed as a special case with just one label. Our model makes use of Conditional Random Field (CRF) techniques (as described by Lafferty, McCallum and Pereira in "Conditional Random Fields: Probabilistic models for segmenting and labeling sequence data" in ICML, 2001), and allows the probability distribution to be conditioned on arbitrary observed data. This model is widely applicable to joint segmentation and classification tasks, which are common in computer vision, handwriting recognition, speech and natural language processing. The Markov Random Field (MRF), which is an undirected graphical model whose potential functions do not depend on observed data, is for the purposes of this document a special case of the CRF, and can also be extended in the way described below.

The Probabilistic Model

Let G be an undirected graph consisting of vertices V and edges E. We assume that G is triangulated, so that every cycle of length greater than three is spanned by a chord. This can always be achieved by adding edges, but usually at the expense of increasing the maximum clique size, and therefore computational complexity.

Let S be a partition of G, that is, a set of non-empty subsets of V, such that each vertex in V is a member of precisely one subset. Each subset is referred to as a part of G. In this document, the term partition will always refer to a contiguous partition:

Definition 1. A partition of G is contiguous if and only if all parts are internally connected. In other words, if i and j are vertices contained within the same part, there exists a path on G between i and j entirely contained within that part.

A labeled partition of G is represented by Y=(S, y), where S describes the partition and $y \in \{-1, +1\}^M$ is a vector containing the labels associated with each part. For example, a partition of three elements into two parts could be S={{1} {2, 3}}, y=[+1, −1]. Let Y be the set of all possible labeled partitions of G. Note that M, the length of y, is dependent on S. Let $t_i$ be the index of the part to which vertex i is assigned, so that $y_{t_i}$ is the label given to that vertex.

In this work, the conditional probability distribution over Y has the form P(Y|x,θ)=

$$\frac{1}{Z(\theta)} \prod_{i \in V} \psi_i^{(1)}(Y, x; \theta) \prod_{i,j \in E} \psi_{ij}^{(2)}(Y, x; \theta), \quad (1)$$

where x is the observed data, θ is a vector representing the model parameters collectively, and Z(θ) is a normalization constant. $\Psi_i^{(1)}$ are unary potentials defined for each vertex, and $\Psi_{ij}^{(2)}$ are pairwise potentials defined for each edge. The unary potentials introduce a data-dependent bias towards assigning one label or the other to each vertex. The pairwise potentials model the compatibility between the parts and labels of neighboring vertices, and are also data dependent. The dependence of these potentials on x is through feature vectors, $g_i$ and $f_{ij}$, defined for each vertex i and edge (i, j) respectively. The potentials then have the form $$\psi_i^{(1)}(Y, x, \theta) = \begin{cases} \phi(w_+ \cdot g_i(x)) & \text{if, } y_{t_i} = +1 \\ \phi(w_- \cdot g_i(x)) & \text{if, } y_{t_i} = -1 \end{cases}, \quad (2)$$

where $\phi(\cdot)$ is a non-linear mapping, and $w_+$ and $w_-$ are vectors of feature weights depending on the label of the appropriate vertex. In this work, we will always use an exponential non-linearity, $\phi: x \mapsto \exp(x)$, although in general other functions may be used. The pairwise potentials are defined by $$\psi_{ij}^{(2)}(Y, x, \theta) = \begin{cases} \phi(v_{ss} \cdot f_{ij}(x)) & \text{if, } t_i = t_j, y_{t_i} = y_{t_j} \\ \phi(v_{sd} \cdot f_{ij}(x)) & \text{if, } t_i \neq t_j, y_{t_i} = y_{t_j} \\ \phi(v_{dd} \cdot f_{ij}(x)) & \text{if, } t_i \neq t_j, y_{t_i} \neq y_{t_j} \end{cases} \quad (3)$$

where $v_{ss}$, $v_{sd}$ and $v_{dd}$ are vectors of feature weights to be used when i and j belong to the same part, different parts with the same label, and different parts with different labels respectively. The fourth case, corresponding to vertices with different labels in the same part, does not occur by definition. The parameters in θ are therefore ($w_+$, $w_-$, $v_{ss}$, $v_{sd}$, $v_{dd}$). Note that there is a redundancy in the weight vectors. In one example, $w_-$ and $v_{dd}$ were constrained to be 0 although this is not essential.

Training

The overall goal of the model above is to predict labeled partitions of unseen data. In order to do this, we must first estimate the model parameters, θ. These parameters are learned from example data. Given a labeled training example, (x, Y), the posterior probability of the parameters is given using Bayes' rule, $$P(\theta|x,Y) \propto P(Y|x,\theta) \cdot P(\theta), \quad (4)$$

where $P(\theta)$ is a prior distribution over the weights. The model is trained by finding the maximum a posteriori weights using a quasi-Newton gradient ascent algorithm (specifically, the BFGS method). A significant advantage is that the model is convex in the parameters, meaning that we are guaranteed to find the global maximum using gradient ascent. The gradient of the log posterior, LP, with respect to a parameter $\theta_k$ is given by $$\frac{\partial}{\partial \theta_k} LP = \sum_{i \in V} \left( \frac{\partial}{\partial \theta_k} \log \psi_i^{(1)} - \left\langle \frac{\partial}{\partial \theta_k} \log \psi_i^{(1)} \right\rangle \right) + \frac{\partial}{\partial \theta_k} \log(P(\theta)) \quad (5)$$

if $\theta_k$ is a parameter of the unary potentials. The gradients with respect to parameters of the pairwise potentials have a similar form. It is straightforward to generalize this expression to handle multiple training examples. The brackets, ⟨...⟩, in the second terms represent expectations with respect to the distribution over Y given by the current parameter values. This requires the computation of marginal probability distributions for individual vertices and pairs of vertices connected by an edge. Furthermore, the optimization algorithm needs to evaluate (1) explicitly, which in turn requires evaluation of the partition function, $$Z(\theta) = \sum_{Y} \prod_{i \in V} \psi_i^{(1)}(Y, x; \theta) \prod_{i,j \in E} \psi_{ij}^{(2)}(Y, x; \theta). \quad (6)$$

Both of these tasks involve summations over subsets of possible labeled partitions. This summation can be performed efficiently by message passing using a modified version of the sum-product algorithm. The details of this algorithm are given below.

Inference

In general, we are interested in using the trained model to group and label unseen data. This is achieved by finding the most probable configuration, $$Y^{MAX} = \arg\max_{Y} \prod_{i \in V} \psi_i^{(1)}(Y, x; \theta) \prod_{i,j \in E} \psi_{ij}^{(2)}(Y, x; \theta). \quad (7)$$

As with the partition function, this maximization can be performed efficiently using a version of the max-product algorithm.

Operations Over Labeled Partitions

Above, it was shown that an important part of both the training and inference processes is the enumeration of all possible labeled partitions, in order to either sum or maximize over them. As in the more usual case of labeling vertices, explicit enumeration of all possible values is prohibitively expensive. However, as we show below, we are able to exploit the structure of the graph to significantly reduce the computational cost, rendering exact inference tractable in many cases. The derivation below follows the conditions for the possibility of local computation provided by Shenoy and Shafer ("Axioms for probability and belief-function propagation. In Readings in uncertain reasoning, Morgan Kaufmann, pages 575-610, 1990"). An alternative derivation however is possible following Lauritzen "Graphical models" OUP 1996.

If G is a subset of V, we use $Y_G \in Y_G$ to denote a labeled partition of the corresponding induced subgraph. We define consistency as follows:

Definition 2. Labeled partitions $Y_G$ and $Y_H$, of subgraphs G and H respectively, are consistent, denoted $Y_H \sim Y_G$, if and only if:

All vertices appearing in G∩H, are assigned the same label by $Y_G$ and $Y_H$, and all pairs of vertices appearing in G∩H are in the same part in $Y_G$ if and only if they are in the same part in $Y_H$.

The notation $\hat{Y}_G(Y_{G \cup H})$ is used to denote the unique labeled partition of G which is consistent with $Y_{G \cup H}$. The maximal cliques of G are defined in the usual way, and are denoted $C_1, \ldots, C_N$. If b and t are two cliques, and b contains all vertices from t which appear in cliques other than t, then b is said to be a branch and t is the corresponding twig.

Following the framework of Shenoy and Shafer, we introduce the notion of a valuation Ψ on a subset of V. In the case of standard belief propagation, valuations are functions assigning a real, non-negative value to possible configurations of subsets of the variables. In this work, a valuation on a subset G will be defined as a function mapping $Y_G$ to the non-negative real numbers. $V_G$ is the set of all valuations on G. In the case where the valuation is over the whole of G, the range of the valuation will be interpreted as being proportional the probability of the corresponding labeled partition. In the case of valuations defined over subsets of V the valuations are referred to as potentials of which those defined in (1) are an example. We define two operations on valuations:

Combination: Suppose G and H are subsets of V and $\Psi_G$ and $\Psi_H$ are valuations on those subsets. The operation of combination defines a mapping $\otimes$: $V_G \times V_H \mapsto V_{G \cup H}$, such that the line immediately below equals the line immediately below that $$\Psi_G \otimes \Psi_H(Y_{G \cup H})$$

$$\Psi_G(\hat{Y}_G(Y_{G \cup H})) \cdot \Psi_H(\hat{Y}_H(Y_{G \cup H})). \quad (8)$$

Marginalization: Suppose G and H are subsets of V such that G ⊆ H, and $\Psi_G$ and $\Psi_H$ are valuations as before. Marginalization is a mapping ↓: $V_H \mapsto V_G$ such that the following equation applies where the right hand side of the equation comprises only the summation term (no equals sign is shown) and the summation is over $Y_H \sim Y_G$, $$\psi_H^{\downarrow G}(Y_G) \sum_{Y_H \sim Y_G} \psi_H(Y_H). \quad (9)$$

A valuation over the whole graph is said to factor if it can be written as the combination of valuations on the cliques, $$\psi(Y) = \bigotimes_{i=1}^{N} \psi_i(Y_i), \quad (10)$$

where i runs over the cliques in G. As combination allows products of valuations over subsets of a clique to be written in terms of a single valuation over the whole clique, the model given in (1), excluding the partition function, is in this form. Before demonstrating the possibility of efficient local computation, we first demonstrate that three axioms due to Shenoy and Shafer are satisfied:

Axiom 1. Commutativity and associativity of combination. If G, H and K are subsets of V, for any valuations $\Psi_G$, $\Psi_H$, and $\Psi_K$, we have $\Psi_G \otimes \Psi_H = \Psi_H \otimes \Psi_G$ and $\Psi_G \otimes (\Psi_H \otimes \Psi_K) = (\Psi_G \otimes \Psi_H) \otimes \Psi_K$.

Proof. Follows directly from the definition of combination.

Axiom 2. Consonance of marginalization. If G, H and K are subsets of V such that $K \subseteq G \subseteq H$ for any valuations $\Psi_G$, $\Psi_H$ and $\Psi_K$, $$(\psi_H^{\downarrow G})^{\downarrow K} = \psi_H^{\downarrow K}. \quad (11)$$

Proof. Writing the marginalization explicitly, $$(\psi_H^{\downarrow G})^{\downarrow K} = \sum_{Y_G \tilde{Y}_K} \sum_{Y_H \tilde{Y}_G} \psi_H(Y_H) \quad (12)$$

$$= \sum_{Y_H \tilde{Y}_K} \psi_H(Y_H)$$

$$= \psi_H^{\downarrow K},$$

(the summations should all have tildes in the above equations) where the second line follows as for any $Y_H \sim Y_K$, there is a unique $Y_G$ such that $Y_G \sim Y_K$ and, and $Y_H \sim Y_G$ for any $Y_H$ negative tilde $Y_K$, no such $Y_G$ exists.

Axiom 3. Distributivity of marginalization over combination. If G and H are subsets of V, for any valuations $\Psi_G$ and $\Psi_H$, $(\Psi_G \otimes \Psi_H)^{\downarrow G} = \Psi_G \otimes (\Psi_H^{\downarrow G \cap H})$.

Proof. Performing an explicit expansion gives $$(\psi_G \otimes \psi_H)^{\downarrow G} = \sum_{Y_{G \cup H} \tilde{Y}_G} \psi_G(\hat{Y}_G(Y_{G \cup H})) \cdot \psi_H(\hat{Y}_H(Y_{G \cup H})) \quad (13)$$

$$= \psi_G(Y_G) \cdot \sum_{Y_{G \cup H} \tilde{Y}_G} \psi_H(\hat{Y}_H(Y_{G \cup H}))$$

$$= \psi_G(Y_G) \cdot \sum_{Y_H \tilde{Y}_{G \cap H}(Y_G)} \psi_H(Y_H), 0.3 \text{ cm}$$

where the first two of the summations above should have a tilde symbol before the $Y_G$ and the third summation should have a tilde symbol after the $Y_H$ which is equal to $\Psi_G \otimes (\Psi_H^{\downarrow G \cap H})$ by definition. □

Sum-Product Algorithm

We have developed an extension of the sum-product algorithm suitable for probability distributions over partitions. As with the more usual form of this algorithm, our method exploits the known structure of G by passing messages containing the results of local computations. Our goal is to compute sums over a subset of all possible partitions, such as those needed for the partition function, as given in (6). This task should be contrasted with that of the usual sum-product algorithm, which sums over assignments of labels to the vertices. Since we sum over a different domain we will need to modify the messages passed and the ranges of summation. As described below, we also adapt the max-product algorithm for labeled partitions. Consider a sum of form:

$$f_s(Y_1) = \sum_{Y \tilde{Y}_1} P^*(Y) = (P^*(Y))^{\downarrow C_1}, \quad (14)$$

(there should be a tilde symbol between the Ys on the summation range values) where P* is a (possibly unnormalized) probability distribution over labeled partitions of G. Let the cliques be numbered, $C_1, \ldots, C_N$ such that $C_1$ is the clique containing the vertices onto which we wish to marginalize and such that for all k, $C_k$ is a twig in the graph $C_1 \cup C_2 \cup \cdots \cup C_k$. (there should be three dots between the adjacent superset symbols) Such an ordering is always possible if G is triangulated. According to Axiom 2, this can be expressed as $$f_s(Y_1) = ((P^*(Y))^{\downarrow V, C_N})^{\downarrow C_1} \quad (15)$$

$$= \left(\left(\bigotimes_{i=1}^{N} \psi_i(Y_i)\right)^{\downarrow V, C_N}\right)^{\downarrow C_1}$$

$$= \left(\left(\bigotimes_{i=1}^{N-1} \psi_i(Y_i)\right) \otimes (\psi_N(Y_N)^{\downarrow C_N \cap V})\right)^{\downarrow C_1} \cdot 2 \text{ cm}$$

(the 0.2 cm in the line above should be ignored)

In the last step, Axiom 3 has been used. $C_N$ is a twig by construction. Let $C_B$ be a corresponding branch, then $C_N \cap V = C_N \cap C_B$, hence $$f_s(Y_1) = \left(\left(\bigotimes_{\substack{i=1 \\ i \neq B}}^{N} \psi_i(Y_i)\right) \otimes \psi_B(Y_B) \otimes (\psi_N(Y_N)^{\downarrow C_N \cap C_B})\right)^{\downarrow C_1}. \quad (16)$$

In other words, the problem can be converted to an equivalent marginalization over a graph with one less clique in which the potential for $C_B$ has been replaced according to:

$$\psi_B \leftarrow \psi_B \otimes (\psi_N^{\downarrow C_N \cap C_B}). \quad (17)$$

By repeatedly eliminating cliques in this way we can systematically remove cliques until there is only one remaining, $C_1$. Any further summation which is required (either to give marginals over a smaller subset of vertices, or to calculate the partition function) can be performed explicitly.

Message Passing

The result of the elimination illustrated in (17) can be interpreted in terms of a message passed from $C_N$ to the rest of the graph. Messages are passed between cliques along edges in a junction tree. Let $\mu_{i \to j}(Y_j)$ be the message passed from $C_i$ to $C_j$. The form of the message is a list of labeled partitions of the intersection $C_i \cap C_j$, each of which has an associated scalar value. The messages are updated iteratively according to the rule:

$$\mu_{i \to j}(Y_j) \leftarrow \sum_{Y_i \tilde{Y}_j} \psi_i(Y_i) \prod_{\substack{k \in N(i) \\ k \neq j}} \mu_{k \to i}(Y_i), \tag{18}$$

(the summation should have a tilde symbol between the $Y_i$ and $Y_j$)

with the outgoing messages from a clique being updated once all incoming messages from the other neighboring cliques $N(\cdot)$ have been received. As the junction tree has no cycles, this process will terminate after a finite number of iterations. Having updated all of the messages, it is then possible to find $f_s$ using $$f_s(Y_i) = \psi_1(Y_1) \prod_{k \in (1)} \mu_{k \to 1}(Y_1). \tag{19}$$

Having defined the algorithm formally, it is useful to also give an intuitive interpretation. The message passed from $C_i$ to $C_j$ can be interpreted as a statement summarizing the values of the 'upstream' potentials for labeled partitions which are consistent with each labeled partition of the separator between $C_i$ and $C_j$. As is the case with the usual form of the sum-product algorithm, the same messages are used in computing different marginals. Marginal distributions for all cliques can be found simultaneously with a single bidirectional pass of the message update rule.

Figure 12:
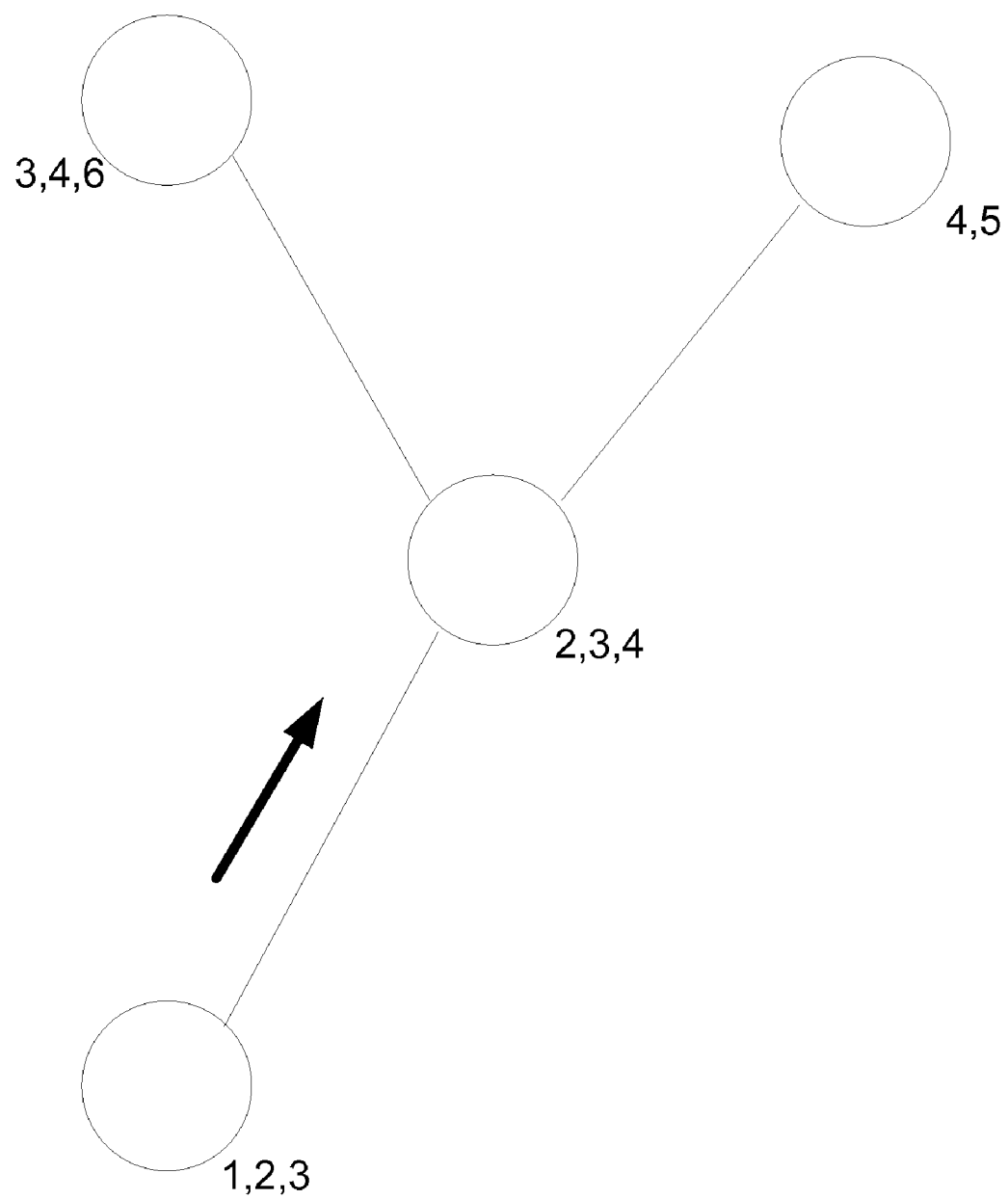
FIG. 12 is a schematic diagram of a clique tree.

FIG. 12 illustrates an example of the message passing process. It shows a junction tree. In this case the potentials are uniform and independent of data for clarity and are illustrated in table (b) below. The clique potential for the clique consisting of vertices 1, 2 and 3 is shown in table (c) and the message passed from (123) to (234) concerning labeled partitions of vertices 2 and 3 is shown in table (d).

TABLE b

| Potential | Value |
| --- | --- |
| $\psi_{ij}(t_i = t_j, y_i = y_j)$ | 0.6 |
| $\psi_{ij}(t_i \neq t_j, y_i = y_j)$ | 0.4 |
| $\psi_{ij}(t_i \neq t_j, y_i \neq y_j)$ | 0.2 |

TABLE c

| Partition | Label | Value |
| --- | --- | --- |
| (123) | + | 0.216 |
| (123) | − | 0.216 |
| (12)(3) | +, + | 0.096 |
| (12)(3) | +, − | 0.024 |
| . | . | . |
| . | . | . |
| . | . | . |
| (1)(2)(3) | −, −, − | 0.064 |

TABLE d

| Partition | Label | Value |
| --- | --- | --- |
| (23) | + | 0.336 |
| (23) | − | 0.336 |
| . | . | . |
| . | . | . |
| (2)(3) | −, − | 0.272 |

Max-Product Algorithm

Just as is the case for the usual form of the sum-product algorithm, it is possible to replace the summation in (14) with a maximization to obtain the max-product algorithm. This is equivalent to a redefinition of marginalization to represent the maximum valuation consistent with the sub-partition rather than the sum over all valuations. This algorithm is used to compute maximizations, for example the configuration of $C_1$ in the most probable labeled partition, $$Y_1^{MAX} = \underset{Y_1}{\arg\max} \underset{\tilde{Y}_1}{\max} P^*(Y).$$

(max should have a tilde symbol between the $Y_i$ and $Y_j$)

In the context of probabilistic inference, this is necessary when searching for the most probable configuration. Message passing is done in the same way as described above, with a modified message update rule.

$$\mu_{i \to j}(Y_j) \leftarrow \underset{Y_i \tilde{Y}_j}{\max} \psi_i(Y_i) \prod_{\substack{k \in N(i) \\ k \neq j}} \mu_{k \to i}(Y_i). \tag{21}$$

(max should have a tilde symbol between the $Y_i$ and $Y_j$)

Having updated all of the messages, $Y_1^{MAX}$ can be found using $$Y_1^{MAX} = \arg \max_{Y_1} \psi_1(Y_1) \prod_{k \in N(1)} \mu_{k \to 1}(Y_1). \tag{22}$$

To find the global maximum configuration, we repeat the above for all possible roots, and reconstruct the global partition as the union of the local configurations (which will be consistent with one another).

Again, it is instructive to consider the intuitive meaning of the messages. In this case they can be interpreted as statements about the maximum value that can be achieved 'upstream' as a function of the clique separator configuration. When the next cluster computes its maximum configuration, the contribution of downstream potentials can therefore be incorporated from the messages rather than having to be recomputed from scratch each time.

Edge-Dual Representation

Let us consider two alternative representations which cast the inference task so that it can be solved using the standard forms of the sum-product and max-product algorithms. In the first of these techniques, rather than working with partitions, a 'part ID' is assigned to each vertex. The corresponding partition is therefore defined so that contiguous regions with the same part ID are assigned to the same part. To allow for labeled partitions, a separate set of part IDs must be reserved for each label.

This approach has several problems. Firstly, we must ensure that enough part IDs are available to realize all possible partitions. Depending on the structure of G, a lower bound on the minimum number required is the size of the largest clique. In practice the required number will be greater than this. In general, this means that inference will be significantly slower than the equivalent binary labeling problem.

A more serious drawback of this approach is that it introduces bias into the results; finding the most probable assignment of part IDs is not equivalent to finding the most probable partition; the latter marginalizes over the multiple assignments of IDs which correspond to the same partition.

An alternative representation which avoids these problems is to use indicator variables, x(Y), for each edge in G. For binary labels, these variables are over a set of six values: two states corresponding to segments belonging to the same part with each label, and four corresponding to different parts with all four combinations of labels. To construct a graphical model for these variables, we define the edge-dual graph:

Definition 3. For any graph G, the edge-dual graph, $\tilde{G}=(V, E)$ contains one vertex for each edge in G. Vertices in the edge-dual graph are connected by an edge if and only if all vertices connected to their corresponding edges in G belong to the same clique.

Definition 4. A configuration of the edge-dual vertices is valid if and only if it corresponds to a labeled partition of G.

Invalid configurations arise when pairwise constraints yield contradictory information; following one path between two vertices on G indicates that they are in the same part, whereas another path indicates that they are not, or their labels disagree. It is possible to establish the validity of a configuration using only calculations local to cliques on the edge dual graph.

Suppose P*(x(Y)) (where the x symbol should have a hat on it) is a probability distribution over labeled partitions of G as represented by the edge-dual variables. We are generally interested in operations such as the summation of P* over all partitions. Rather than expressing the summation in terms of partitions, we can work directly with x, provided that the summation is limited to those configurations which are valid. This can be achieved by introducing an indicator function, I(x), which takes the value 1 if x is valid and 0 otherwise, $$\sum_Y P^*(x(Y)) = \sum_x I(x) \cdot P^*(x). \quad (23)$$

where the x symbols should have hats on them

There is a one-to-one correspondence between cliques in G and the edge dual graph, so functions which factor according to G also factor according to the edge dual graph. If P* factors, we can write $$\sum_Y P^*(x(Y)) = \sum_x \left( \prod_i I_i(x_i) \cdot \psi_i(x_i) \right).$$

where the x and phi symbols should have hats on them where i ranges over the cliques of the edge dual graph. In (24), the local nature of I has been used to factor it as well as P*. The result is a sum over a function which factors according to the edge dual graph, so it can be found using the standard sum-product algorithm.

Complexity

The dominant factor in the complexity of the message passing algorithm is the time taken to process all possible partitions of the largest clique. The table below lists the number of possible configurations for the various cases. It can be seen from the table that the method described above offers a considerable improvement in the complexity of the calculations.

The table below indicates the sizes of the message tables for each of the methods. (a) Unlabeled Partitions (these are the Bell numbers). (b) Binary labeled partitions (c) Binary labeled edge-dual representation. (d) Binary labeled part IDs (lower bound).

| | Clique Size | | | | | |
|---|---|---|---|---|---|---|
| | | | | | n | |
| (a) | 2 | 5 | 15 | 52 | 203 | Bell no. $B_n$ |
| (b) | 6 | 22 | 94 | 454 | 2430 | A001861 [6] |
| (c) | 6 | 216 | 46656 | $6.0 \times 10^7$ | $4.7 \times 10^{11}$ | $6^{n(n-1)/2}$ |
| (d) | 16 | 216 | 4096 | $1.0 \times 10^5$ | $3.0 \times 10^6$ | $(2n)^n$ |

Application to Ink Data

FIG. 11 shows an example of an undirected graph constructed from the input data in which each vertex represents an ink fragment.

An example is now described in which we apply the algorithm developed above to the task of parsing hand-drawn ink diagrams, focusing on the particular problem of grouping electronic ink strokes into perceptually salient objects and labeling the resulting groups. We demonstrate our approach on organization charts such as that shown in FIG. 2, where objects are labeled as either containers or connectors. However, the method is general and may be applied to a wide variety of related problems.

Pre-Proccessing

The input data is a set of ink strokes, which may span multiple objects. The first stage is to split the strokes into fragments, which are assumed to belong to a single object, by dividing each stroke into sections which are straight to within a given tolerance.

Having fragmented the strokes, we build an undirected graph, G, containing one vertex for each ink fragment (See FIG. 11). This is the graph which will be partitioned to obtain the grouping of ink fragments. In our algorithm, G is constructed by first building a candidate graph (which is not necessarily triangulated) by connecting all pairs of fragments satisfying an appropriate distance constraint. Additional edges are added to create a triangulated graph, and pairwise feature vectors are generated for all edges on the new graph, including those which were added during triangulation. This approach gave a mean tree-width of 4.0 when applied to our training database. By modifying the algorithm to constrain the tree-width, an adjustable compromise between speed and accuracy can be obtained.

Features and Priors

We chose features to reflect the spatial and temporal distribution of ink strokes, for example lengths and angles of fragments, whether two fragments were drawn with a single stroke, and the temporal ordering of strokes. We also used a number of 'template' features which were designed to capture important higher level aspects of the ink, such as the presence of T-junctions.

We use Gaussian priors, with correlations specified between the priors for weights corresponding to related features. In total 61 unary features and 37 pairwise features were used. However, this is an example only. Any suitable number of unary and pairwise features can be used.

Results

Labeling errors for the three models are shown in the table below. Results are the mean of three cross-validation splits. Relative differences are shown between models L and LI, and between LI and PLI where L stands for labeling only, LI stands for labeling independently and PLI stands for partitioning and labeling. The mean relative differences are aggregations of the differences for each split, rather than the differences between the means for individual models. This is to reduce the effect of systematic variation between splits.

|         |                  |
| ------- | ---------------- |
| L       | 8.5%             |
| LI      | 4.5%             |
| % Δ LI/L | −48.9% ± 24.9%  |
| PLI     | 2.6%             |
| % Δ PLI/LI | −42% ± 8%     |

To test the performance of the method, we used a database of 40 example diagrams, consisting of a total of 2157 ink fragments. Three random splits were generated, each consisting of 20 examples used for training and 20 used for evaluation. Training was performed by finding the MAP weights as described above. The models were tested by finding the most probable partition and labeling as described in above, and counting errors made against ground-truth data.

For comparison, we also consider two related models which model labeling only, without considering partitioning. The first of these models has a similar form to that described in Section 2, but uses pairwise potentials given by $$\psi_{ij}^{(2)}(y, x, \theta) = \begin{cases} \phi(v_s \cdot f_{ij}(x)) & \text{if } y_i = y_j \\ \phi(v_d \cdot f_{ij}(x)) & \text{if } y_i = y_j, \end{cases} \quad (25)$$

where $v_s$ and $v_d$ are weights corresponding to vertices i and j having the same and different labels respectively. The second related model does not use pairwise potentials at all—ink fragments are labeled independently of the other labelings. In the following, we refer to the full model performing labeling and partitioning as model PLI. LI is the model performing labeling only with pairwise potentials, and L is the model with unary potentials only.

The results given above show that our approach is capable of providing high-quality labeled partitions. The data also illustrate an important point; simultaneous labeling and partitioning produces a significant improvement in labeling performance. The constraint that vertices within the same part must be labeled identically provides strong evidence for the labeling part of the algorithm, and the boundaries between regions of different labels are strong candidates for part boundaries. Hence the two aspects of the algorithm reinforce each other.

It is also possible to provide for incorporation of other local constraints, such as known labels of particular vertices, or information concerning the relationship of two vertices in the partition. These can easily be included through additional potentials which assign zero probability to configurations violating the constraints, and in the context of the ink parsing provide a valuable method for incorporating user feedback. It seems that more complex information, such as priors over the number of parts, can be incorporated by increasing the amount of information passed in the messages.

In some applications the maximum clique size may be too large for exact inference to be feasible, motivating approximate methods. Monte Carlo techniques have already been applied to problems of this sort, but it is desirable to apply alternative approximations such as loopy belief propagation, variational inference or expectation propagation.

We have presented a probabilistic model over labeled partitions of an undirected graph, and have shown that the structure of the graph may be used to efficiently perform exact inference with message passing algorithms. We have demonstrated the application of the model to the task of parsing hand-drawn diagrams. Our experiments illustrate that it is possible to obtain high-quality results using this technique. The results obtained prove that in our applications, labeling accuracy is improved by performing partitioning at the same time.

Although the present examples are described and illustrated herein as being implemented in a system for partitioning electronic ink fragments, the system described is provided as an example and not a limitation. As those skilled in the art will appreciate, the present examples are suitable for application in a variety of different types of data partitioning systems.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A method of automatically partitioning a visual display of a tree comprising data elements into a plurality of labeled parts, said method comprising:

(i) accessing information about the data elements, the data elements of the visual display of the tree including at least visually displayed containers and visually displayed connectors connecting the visually displayed containers;

(ii) forming an undirected graphical model of the data elements using the accessed information, wherein the undirected graphical model comprises a plurality of nodes each associated with a portion of the data elements and a plurality of edges connecting the nodes, wherein each node and edge is associated with a potential function, each potential function having a weight that is pre-computed during a training state the weight determined according to whether the nodes at the ends of the edge belong to a same part, to different parts with a same label, or to different parts with different labels; and (iii) using the undirected graphical model to simultaneously partition the data elements into the plurality of parts and associate the data elements with labels, the labels including at least a container label and a connector label, wherein The simultaneously partitioning and labeling includes simultaneously determining an optimum label and a partition associated with each node based at least on part on a collection of previously labeled and partitioned graphical models and the weights obtained during the training state are used and a maximum a posteriori solution is sought in order to find the optimum labeling and its probability;

Each part of the plurality of parts is represented by a contiguous region in the undirected graphical model with all nodes in the contiguous region having a same label, the label being different from labels of other nodes belonging to others parts of the plurality of parts, at least one of the other nodes being contiguous with at least one of the nodes in the contiguous region, at least one of the parts includes two or more of the plurality of nodes, each node belongs to only one part, and the partitioning includes using message passing with a modified sum product algorithm, the modified sum product algorithm computing sums over a subset of all possible partitions, wherein an edge potential is associated with each edge, a given edge potential being a function of at least interaction features associated with that edge weighted with a value according to whether nodes at the ends of the edge belong to the same part.

2. A method as claimed in claim 1 wherein the undirected graphical model is formed using any of Markov Random Field techniques and Conditional Random Field techniques.

3. A method as claimed in claim 1 wherein the information about the data elements comprises any of spatial features, temporal features, lengths, angles and presence of T-junctions.

4. A method as claimed in claim 1 wherein the values of the weights are determined during training stage using data elements partitioned into known parts.

5. A system for automatically partitioning a visual display of a tree comprising data elements into a plurality of labeled parts said system comprising:

(i) an input arranged to access information about the data elements, the data elements of the visual display of the tree including at least visually displayed containers and visually displayed connectors connecting the visually displayed containers;

(ii) a processor arranged to form an undirected graphical model of the data elements using the accessed information, wherein the undirected graphical model comprises a plurality of nodes each associated with a portion of the data elements and a plurality of edges connecting the nodes, wherein each node and edge is associated with a potential function, each potential function having a weight that is pre-computed during a training state the weight determined according to whether the nodes at the ends of the edge belong to a same part, to different parts with a same label, or to different parts with different labels; and (iii) using the undirected graphical model to simultaneously partition the data elements into the plurality of parts and associate the data elements with labels, the labels including at least a container label and a connector label, wherein The simultaneously partitioning and labeling includes simultaneously determining an optimum label and a partition associated with each node based at least on part on a collection of previously labeled and partitioned graphical models and the weights obtained during the training state are used and a maximum a posteriori solution is sought in order to find the optimum labeling and its probability;

Each part of the plurality of parts is represented by a contiguous region in the undirected graphical model with all nodes in the contiguous region having a same label, the label being different from labels of other nodes belonging to others parts of the plurality of parts, at least one of the other nodes being contiguous with at least one of the nodes in the contiguous region, at least one of the parts includes two or more of the plurality of nodes, each node belongs to only one part, and the partitioning includes using message passing with a modified sum product algorithm, the modified sum product algorithm computing sums over a subset of all possible partitions, wherein an edge potential is associated with each edge, a given edge potential being a function of at least interaction features associated with that edge weighted with a value according to whether nodes at the ends of the edge belong to the same part.

6. A system as claimed in claim 5 wherein the undirected graphical model is formed using any of Markov Random Field techniques and Conditional Random Field techniques.

7. A system as claimed in claim 5 wherein the information about the data elements comprises any of spatial features, temporal features, lengths, angles and presence of T-junctions.

8. A system as claimed in claim 5 comprising a training module arranged to determine the values of the weights using data elements partitioned into known parts.

9. One or more computer readable media comprising executable instructions that, when implemented, perform a method for automatically partitioning a visual display of a tree comprising data elements into a plurality of labeled parts said method comprising:

(i) accessing information about the data elements, the data elements of the visual display of the tree including at least visually displayed containers and visually displayed connectors connecting the visually displayed containers;

(ii) forming an undirected graphical model of the data elements using the accessed information, wherein the undirected graphical model comprises a plurality of nodes each associated with a portion of the data elements and a plurality of edges connecting the nodes, wherein each node and edge is associated with a potential function, each potential function having a weight that is pre-computed during a training state the weight determined according to whether the nodes at the ends of the edge belong to a same part, to different parts with a same label, or to different parts with different labels; and (iii) using the undirected graphical model to simultaneously partition the data elements into the plurality of parts and associate the data elements with labels, the labels including at least a container label and a connector label, wherein The simultaneously partitioning and labeling includes simultaneously determining an optimum label and a partition associated with each node based at least on part on a collection of previously labeled and partitioned graphical models and the weights obtained during the training state are used and a maximum a posteriori solution is sought in order to find the optimum labeling and its probability;

Each part of the plurality of parts is represented by a contiguous region in the undirected graphical model with all nodes in the contiguous region having a same label, the label being different from labels of other nodes belonging to others parts of the plurality of parts, at least one of the other nodes being contiguous with at least one of the nodes in the contiguous region, at least one of the parts includes two or more of the plurality of nodes, each node belongs to only one part, and the partitioning includes using message passing with a modified sum product algorithm, the modified sum product algorithm computing sums over a subset of all possible partitions, wherein an edge potential is associated with each edge, a given edge potential being a function of at least interaction features associated with that edge weighted with a value according to whether nodes at the ends of the edge belong to the same part.

* * * * *